United States Patent [19]

Williams et al.

[11] 3,739,656

[45] June 19, 1973

[54] SHIFT CONTROL MECHANISM

[75] Inventors: Richard D. Williams, Fairport; Fred G. Michaels, Pittsford, both of N.Y.

[73] Assignee: General Motors Corporation, Detroit, Mich.

[22] Filed: May 13, 1971

[21] Appl. No.: 143,091

[52] U.S. Cl. .............................. 74/473 R, 74/337.5
[51] Int. Cl. ............................................. G05g 9/00
[58] Field of Search .................... 74/473, 475, 476, 74/477, 337.5

[56] References Cited
UNITED STATES PATENTS

| | | | |
|---|---|---|---|
| 2,839,941 | 6/1958 | Rugen | 74/337.5 X |
| 2,968,195 | 1/1961 | Edgley | 74/473 |
| 3,456,522 | 7/1969 | Bieber | 74/475 |

FOREIGN PATENTS OR APPLICATIONS

| | | | |
|---|---|---|---|
| 292,710 | 1/1932 | Italy | 74/337.5 |

*Primary Examiner*—Milton Kaufman
*Attorney*—Warren E. Finken, A. M. Heiter and John P. Moran

[57] ABSTRACT

A transmission shift control mechanism for a standard three-speed and four-speed synchromesh transmission including a single cable connected to a shift lever mounted on the exposed end of a single pivotable shaft extending through a wall of the transmission. On the end of the single pivotable shaft within the transmission housing there is mounted a disc-like element having a pair of contoured cam grooves formed therein for receiving the respective extensions of two conventional shift forks. As the disc-like element is pivoted in response to manual movement of the cable, the cam grooves move the shift fork extensions laterally as required to alternately position one of the shift forks in one of the available speed ratio positions and the other in Neutral.

3 Claims, 16 Drawing Figures

INVENTORS
Richard D. Williams, &
BY Fred G. Michaels
John P. Moran
ATTORNEY

INVENTORS
Richard D. Williams, &
BY Fred G. Michaels
John P. Moran
ATTORNEY

INVENTORS
Richard D. Williams, &
BY Fred G. Michaels

John P. Moran
ATTORNEY

INVENTORS
Richard D. Williams, &
BY Fred G. Michaels

John P. Moran
ATTORNEY

INVENTORS
Richard D. Williams &
BY Fred G. Michaels
John P. Moran
ATTORNEY

SHIFT CONTROL MECHANISM

This invention relates generally to transmission shift control mechanisms and, more particularly, to a single link control device for operating a standard synchromesh transmission.

An object of the invention is to provide a transmission shift control mechanism having a single cable control arrangement for selectively positioning the conventional shift forks of a standard synchromesh transmission.

Another object of the invention is to provide a transmission shift control mechanism having linkage means pivotally connected to a shift lever secured to a single shaft extending from the transmission housing, with improved means associated with the single shaft within the transmission for actuating both shift forks in response to pivotal movement of the single shaft by the cable.

A further object of the invention is to provide a transmission shift control mechanism having a cable pivotally connected to a single shaft extending from the transmission housing, with a butterfly-shaped element mounted on the internal end thereof and including a pair of cam grooves which selectively control the positions of both shift forks.

These and other objects and advantages of the invention will be apparent when reference is made to the following description and accompanying drawings, wherein:

FIG. 1 is a side view of a transmission housing with the exterior portions of the invention mounted thereon;

FIGS. 2 and 3 are fragmentary cross-sectional views taken along the planes of lines 2—2 and 3—3, respectively, of FIG. 1, and looking in the direction of the arrows;

Figure 5:
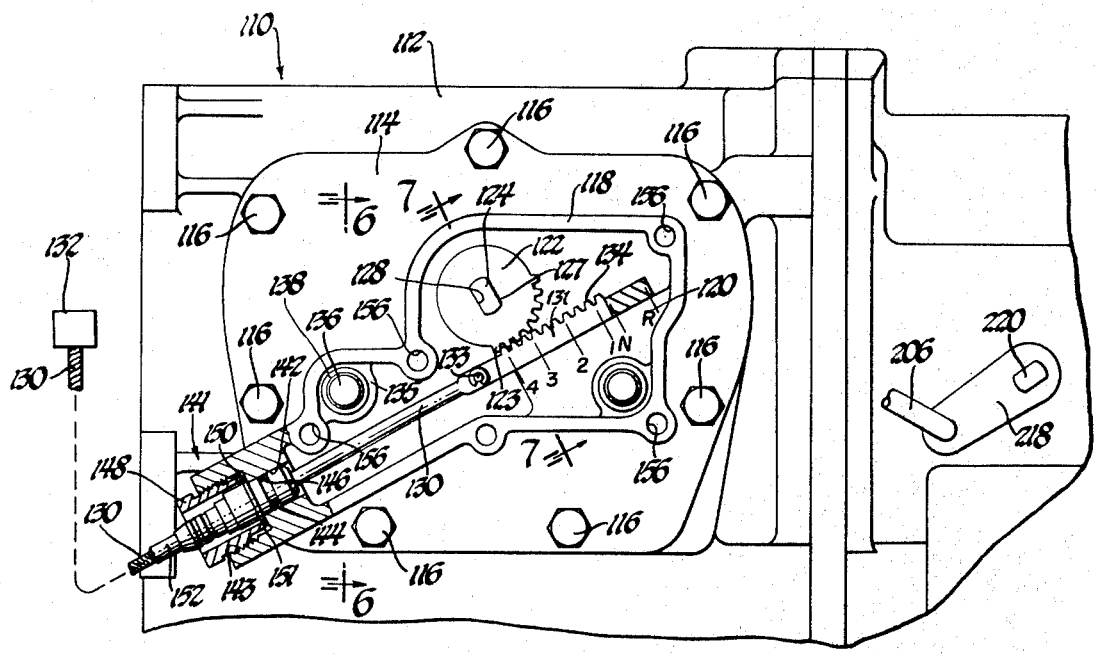
FIG. 5 is a side view of a transmission housing, with the exterior portions of a modification of the invention mounted thereon.
Figure 6:
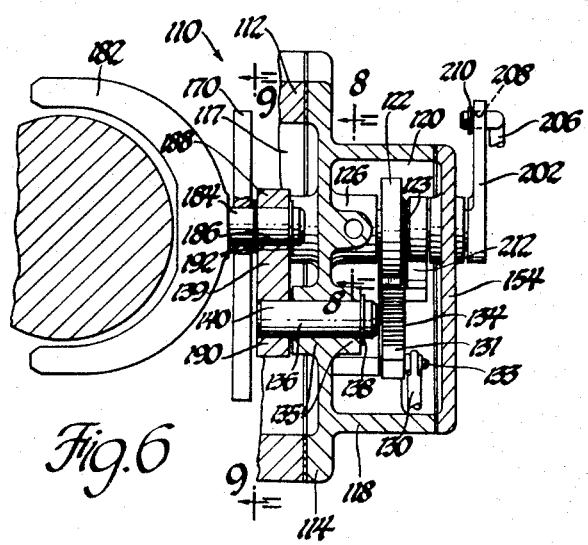
Figure 8:
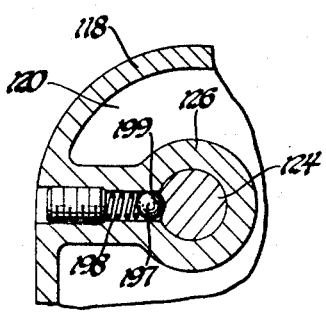
Figure 7:
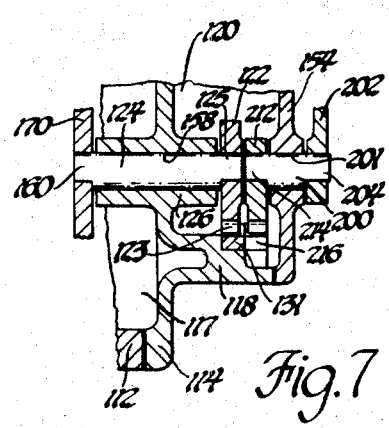
Figure 9:
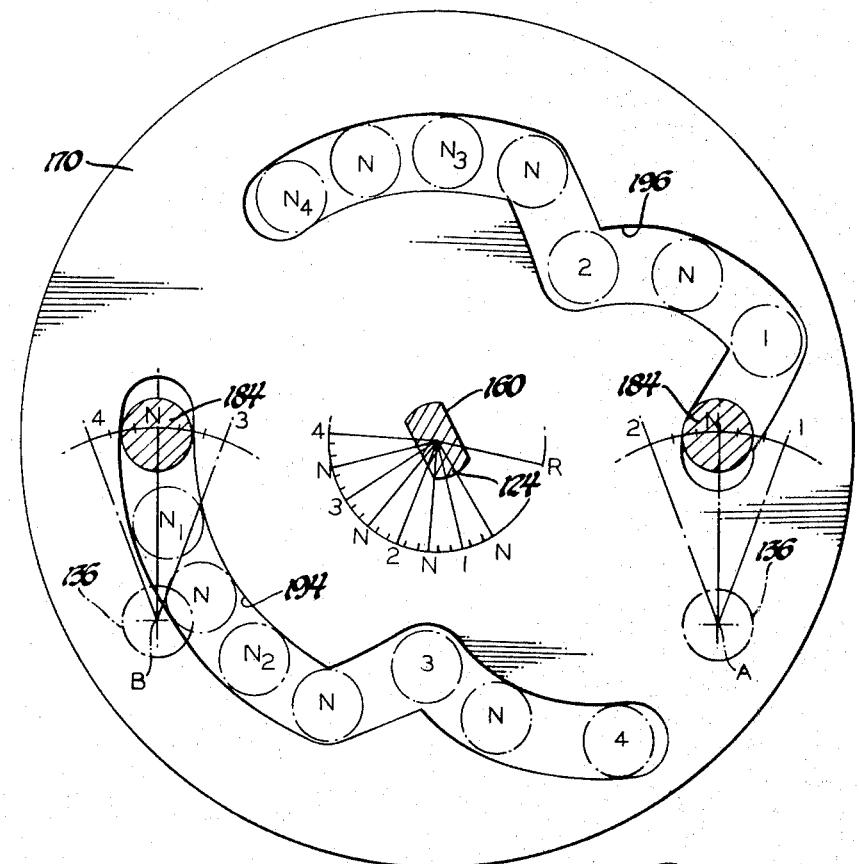
Figure 10:
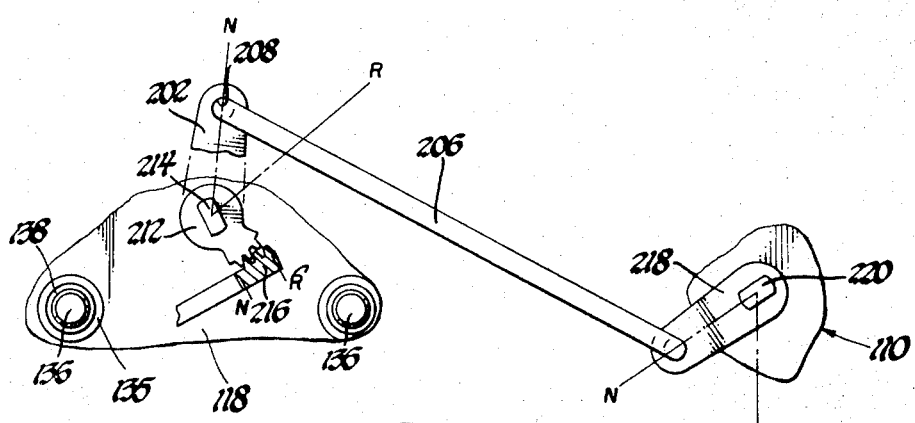
Figure 11:
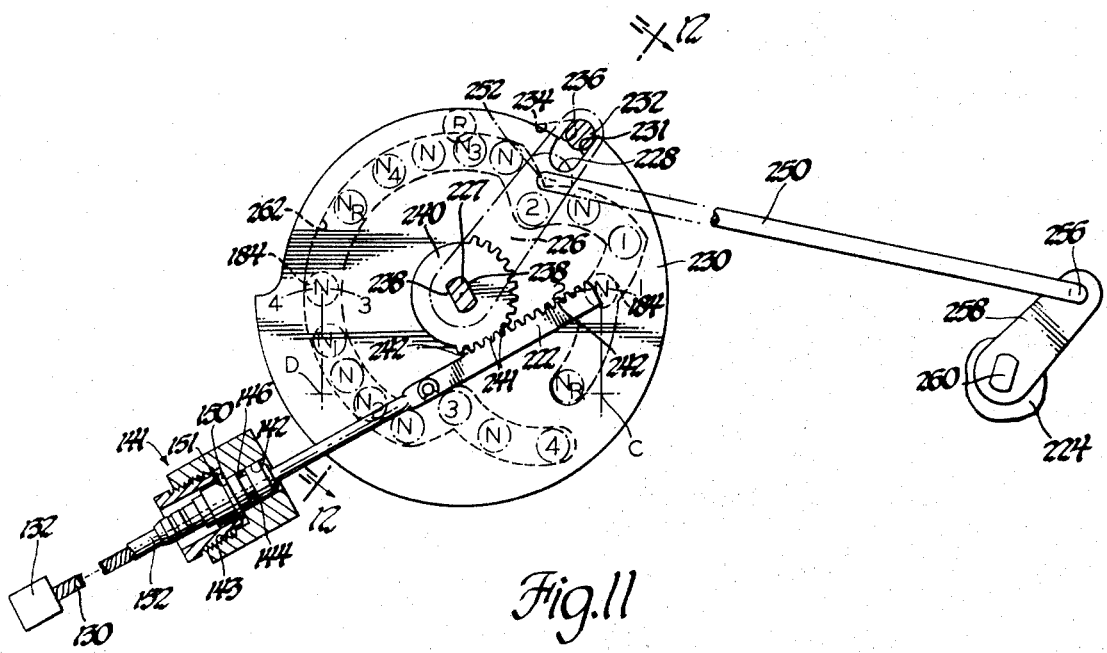
Figure 12:
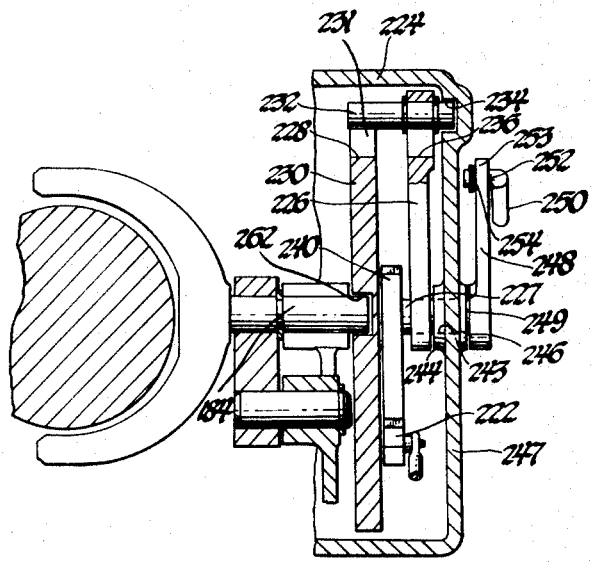
Figure 13:
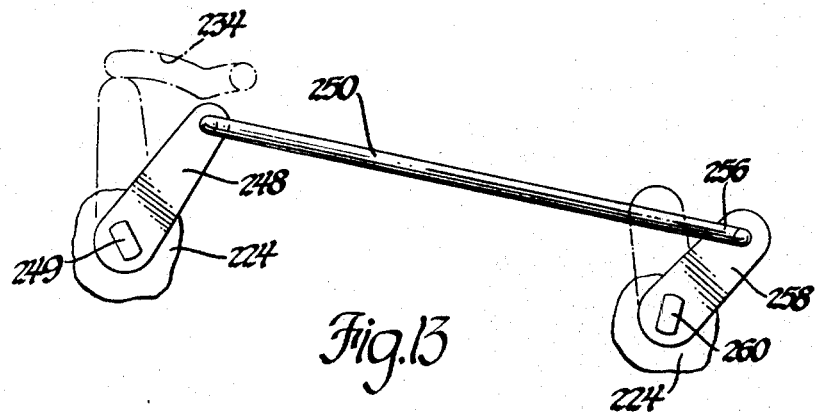
Figure 14:
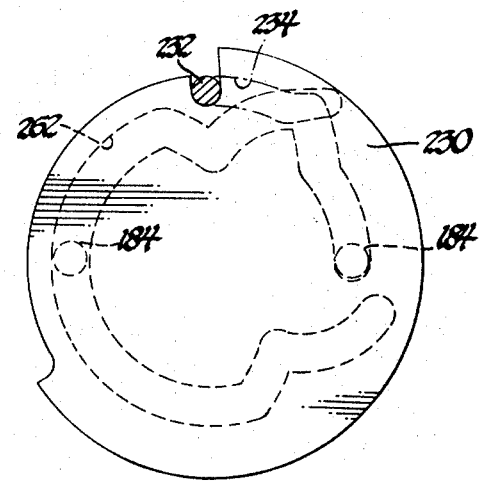
Figure 15:
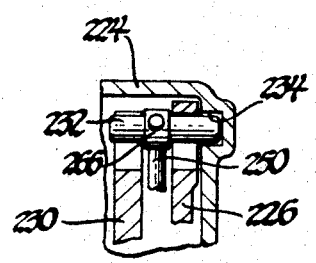
Figure 16:
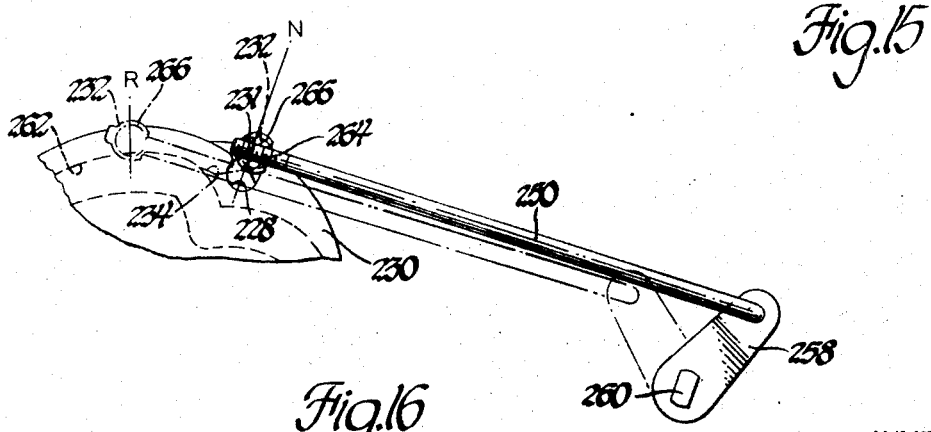

FIGS. 6 and 7 are fragmentary cross-sectional views taken along the planes of lines 6—6 and 7—7, respectively, of FIG. 5, and looking in the direction of the arrows;

FIG. 8 is a fragmentary cross-sectional view taken along the plane of the line 8—8 of FIG. 6, and looking in the direction of the arrows;

FIG. 9 is a cross-sectional view taken along the plane of line 9—9 of FIG. 6, and looking in the direction of the arrows;

FIG. 10 is a view of portions of FIGS. 5-7;

FIG. 11 is a view of a modified portion of the FIG. 5 structure;

FIG. 12 is a cross-sectional view taken along the plane of line 12—12 of FIG. 11, and looking in the direction of the arrows;

FIG. 13 is a view of portions of FIGS. 11 and 12;

FIG. 14 is a view of the FIG. 11 structure in a different operative position; and FIGS. 15 16 are fragmentary views of an alternate embodiment of portions of the FIGS. 11 and 12 structures.

Three-Speed Arrangement

Figures 1, 2:
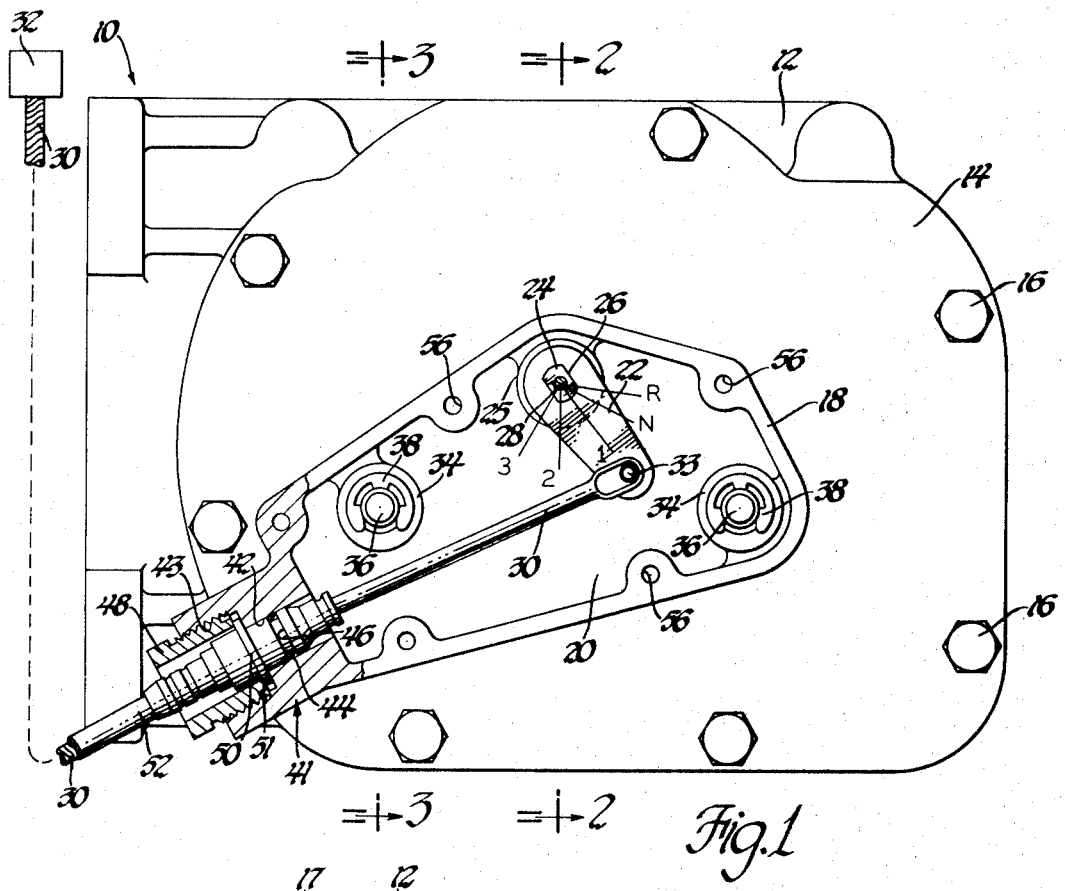

Referring to the drawings in greater detail, FIG. 1 illustrates a conventional transmission housing 10 including a body 12 with an end cover 14 secured thereto by bolts 16 to form a transmission chamber 17. A smaller housing 18 is formed on the cover member 14, providing a cavity 20 in which a lever 22 is pivotally mounted on the end of a shaft 24 extending through a boss 25 formed on the cover 14. The shaft 24 has formed thereon a pair of oppositely disposed flat sides 26 which accommodate a like-shaped opening 28 formed adjacent one end of the lever 22. Suitable linkage means, such as a flexible shift cable 30, extending from a shift control selector, represented generally at 32, is pivotally connected to a pivot pin 33 mounted on the free end of the lever 22. The shift control selector 32 is preferably instrument panel- or steering column-mounted, but may be adapted to a conventional floor-mounted shift lever if desired.

A pair of bored bosses 34 are formed on the cover member 14 in the cavity 20 to accommodate the extension therethrough of a pair of shafts 36 held in place by suitable fasteners or clips, such as E-rings 38. A lever arm 39 is mounted on the end 40 of each shaft 36 in the chamber 17. The cable 30 extends through a fixed connector mechanism 41 mounted in an opening 42 formed in the housing 18. The opening 42 includes an internally threaded outermost portion 43. A seal ring 44 is mounted in an annular groove 46 formed in the connector mechanism 41 to prevent leakage therepast. A hollow, externally threaded plug 48 is threadedly mounted in the internally threaded opening 43, against a collar 50 formed on the connector mechanism 41, retaining the collar against a shoulder 51 formed in the opening 42 and thereby retaining the connector mechanism 41 fixed relative to the housing 18. A cable cover 52 is mounted around the length of the cable 30 between the housing 18 and the shift control selector 32.

As illustrated in FIG. 2, a cover 54 is mounted on the housing 18, enclosing the cavity 20. The mounting of the cover 54 is accommodated by a plurality of screw- or rivet-receiving openings 56 (FIG. 1). It will be noted that the shaft 24 is mounted through an opening 58 formed through the boss 25 and through an extended portion 60 formed on the inner face 62 of the cover 14. The shaft 24 is rotatably mounted on bearings 64 in the opening 58. A small diameter flat-sided end portion 66 of the shaft 24 extends into the chamber 17 within the housing body 12. A butterfly-shaped flat plate member 70 (FIG. 4) is mounted on the flat-sided end 66 and secured thereto by any suitable means, such as a rivet 72.

Figure 3:
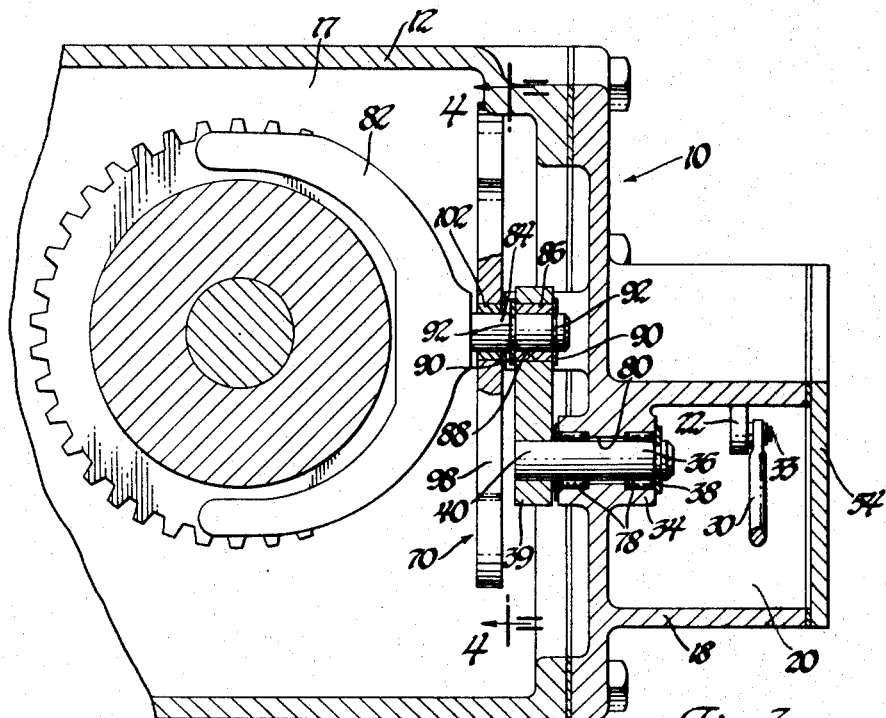

As better seen in FIG. 3, each shaft 36 is mounted on bearings 78 in an opening 80 formed through each boss 34, the end 40 extending therefrom into the chamber 17. A pair of conventional shift forks 82, each having a mounting shaft 84 formed thereon, extend through bushings 86 mounted in openings 88 formed in the upper end (FIG. 3) of the lever arm 39 opposite the lower or shaft end 40. The shift forks 82 are retained axially therein by fasteners 90 mounted in annular grooves 92 formed in each shaft 84 adjacent both faces of the lever arm 39.

Figure 4:
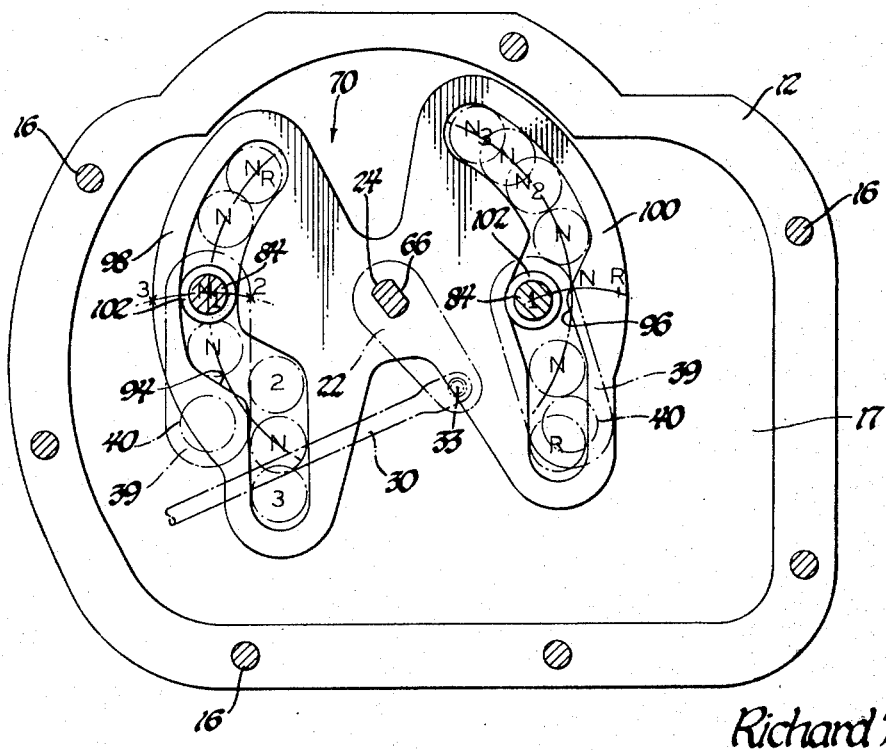
FIG. 4 is a cross-sectional view taken along the plane of line 4—4 of FIG. 3, and looking in the direction of the arrows.

As may be noted in FIG. 4, the butterfly element 70 is mounted at its center on the flat-sided shaft end 66 and includes cam slots or grooves 94 and 96 formed in its wing-like portions 98 and 100, respectively, following the predetermined contoured path illustrated in FIG. 4. The shafts 84 of the shift forks 82 extend through bearings 102 mounted in the respective cam grooves 94 and 96.

In operation, it may be noted in FIG. 1 that manual actuation of the cable 30 will cause the lever 22 to pivot on the boss 25, rotating the shaft 24. As may be noted in FIGS. 1 and 4, rotation of the shaft 24 will, through the shaft extension 66, cause the butterfly element 70 to rotate about the axis of the shaft 24. The various shift positions of the lever 22 which correspond to the usual REVERSE, NEUTRAL, FIRST, SECOND, and THIRD shift positions are illustrated in FIG. 1 as points "R," "N," "1," "2," and "3," respectively. It is apparent that in view of the flat sides 26 formed on the shaft 24, rotation of the lever 22 to any of the aforedesignated five positions will correspondingly rotate the butterfly element 70 to particular positions. The cam grooves 94 and 96 are contoured such that the shaft 84 of each of the two shift forks 82 will be caused to pivot about the respective fixed axes of the shafts 36. This results in the axis of each shaft 84 being moved in an arcuate path such that when any of "R," "1," "2," or "3" shift ratio positions illustrated in FIG. 4 are selected, one of the shafts 84 will be positioned in a neutral position illustrated respectively as "$N_R$," "$N_1$," "$N_2$," and "$N_3$." It may be noted in FIG. 4 that all of the variously illustrated "N" positions fall along an arc of a circle whose center is at the axis of the shaft 24 on which the member 70 is mounted. The lever 22 is illustrated in FIG. 1 as being positioned by the cable 30 in First, and the right-hand shaft 84 in FIG. 4 correspondingly assumes position "1" which positions the associated shift fork 82 as required for a First speed ratio. It will be noted in FIG. 4 that the left-hand shaft 84 at this time is simultaneously positioned in the "$N_1$" position about the axis of the shaft 24 and in the neutral position intermediate the arcuate positions "2" and "3" about the axis of the respective shaft 40.

When the lever 22 (FIG. 1) is next moved to Second or "2" position, it may be noted in FIG. 4 that, due to the contoured shape of the cam grooves 94 and 96, the left-hand shaft 84 will have been moved along an arcuate path from position "N" to a position identified as "2," while the right-hand shaft 84 will have been moved along an arcuate path from position "1" to a position identified as "$N_2$." It may be realized that the butterfly element 70 will have rotated in a clockwise direction about the shaft end portion 66, with the left-hand shaft 84 having been cammed rightwardly by the cam groove 94 until the portion thereof identified by the encircled numeral "2" has moved to the arcuate path "2" position. In the meantime, the portion illustrated as an intermediate upper "$N_2$" position of the cam groove 96 will have rotated downwardly along the arc about the axis of the shaft 24 to the neutral or "N" position on the arc about the axis of the shaft 40.

Rotation of the lever 22 to the Third or "3" position in FIG. 1 by manual actuation of the cable 30 moves the lower left "N" portion of the cam groove 94 to the "N" portion of the arcuate path about the axis of the shaft 40, prior to the extreme lower left or "3" portion of the cam groove 94 in FIG. 4 to the lateral arcuate path "3" position. Correspondingly, the uppermost "$N_3$" portion of the cam groove 96 will have rotated down to the lateral arcuate path "N" position, setting the respective shift forks 82 accordingly.

Assume now a movement of the lever 22 to the Neutral or "N" position in FIG. 1. This rotates the butterfly element 70 in a counterclockwise direction in FIG. 4, moving the encircled letter "N" positions of the lower right-hand portion of the cam groove 96 along the arcuate path about the shaft 24 axis to the "N" position of the arcuate path about the shaft 40 axis; meanwhile, the intermediate encircled "N" position illustrated in the upper portion of the cam groove 94 will have pointed to the "N" position along the arcuate path about the shaft 40 axis, thereby causing a neutral setting within the transmission housing 10.

When the lever 22 is positioned in the Reverse or "R" position of FIG. 1, it may be noted from FIG. 4 that the encircled letter "R" position in the lower portion of the cam groove 96 will have rotated to the "R" position of the arc about the axis of the shaft 40, while the uppermost "$N_R$" position of the cam groove 94 will have rotated downwardly to the intermediate "N" position along the arc about the other shaft 40 axis.

Four-Speed Arrangement

Referring now to the four-speed arrangement illustrated in FIGS. 5–10, there is included a conventional transmission housing 110 including a body 112 with a cover member 114 secured thereto by bolts 116 to form a transmission chamber 117. A smaller housing 118 is formed on the cover member 114 providing a cavity 120. A toothed member 122 having teeth 123 formed around a predetermined portion of the outer periphery thereof is rotatably mounted on the end 125 (FIG. 7) of a shaft 124 extending through oppositely disposed drilled bosses 126 formed on the cover member 114 between the chambers 117 and 120. The shaft 124 has formed thereon a pair of oppositely disposed flat sides 127 which accommodate a like-shaped opening 128 formed in the center of the toothed member 122. Suitable linkage means, such as a flexible shift cable 130 (FIG. 5) extending from a shift control selector, represented generally at 132, is connected by a pivot pin 133 to a toothed rack member 131, the teeth 134 of the latter at times meshing with the teeth 123 of the member 122, as will be explained. The shift control selector 132 is preferably instrument panel— or steering column-mounted but may be adapted to a conventional floor-mounted shift lever if desired.

A pair of drilled bosses 135 (FIG. 6) are formed on the cover member 114 to accommodate the extension therethrough of a pair of shafts 136 held in place by suitable fasteners or clips, such as E-rings 138. A lever arm 139 is mounted on the end 140 of each shaft 136 in the transmission chamber 117. The flexible shift cable 130 extends through a fixed connector mechanism 141 mounted in an opening 142 formed in the smaller housing 118. The opening 142 includes an internally threaded outermost portion 143. A seal ring 144 is mounted in an annular groove 146 formed in the connector mechanism 141 to prevent leakage therepast. A hollow, externally threaded plug 148 is threadedly mounted in the internally threaded opening 143, against a collar 150 formed on the connector mechanism 141 retaining the collar 150 against a shoulder 151 formed in the opening 142 and thereby retaining the connector mechanism 141 fixed relative to the housing 118. A cable cover 152 is mounted around the length of the flexible cable 130 between the housing 118 and the shift control selector 132.

As illustrated in FIG. 6, a cover 154 is mounted on the housing 118 enclosing the cavity 120. The mounting of the cover 154 is accommodated by a plurality of screw- or rivet-receiving openings 156 (FIG. 5). It may be noted in FIG. 7 that the shaft 124 is rotatably mounted through a drilled opening 158 formed through the bosses 126 on the cover member 114. A flat-sided end portion 160 is formed on the shaft 124 in the chamber 117 within the transmission housing 110. A circular flat plate member 170 (FIGS. 7 and 9) is mounted on the flat-sided end portion 160.

As may be realized by referring to FIG. 6, a pair of conventional shift forks 182, each having a mounting shaft 184 formed thereon, extend through openings 186 formed adjacent the upper end 188 (FIG. 6) of the lever arm 139 opposite the lower or shaft-end 190. The shift forks 182 are retained axially therein by fasteners 192 mounted in annular grooves formed in each shaft 184 adjacent both faces of the lever arm 139.

As may be noted in FIG. 9, the circular plate member 170 is mounted at its center on the flat-sided shaft end portion 160 and includes respective left- and right-hand cam slots or grooves 194 and 196 formed in opposite halves of the plate member 170, following the predetermined contoured path illustrated in FIG. 9. The shafts 184 of the two shifts forks 182 extend through the respective cam grooves 194 and 196 and are shown in the Neutral position. When in this position, a ball 197 (FIG. 8) is urged by a spring 198 into a notch 199 formed in the shaft 124 to help retain the latter in this position.

Referring once again to FIG. 7, it may be noted that a shaft 200 extends through an opening 201 formed in the cover member 154, axially aligned with the shaft 124. A lever 202 is secured to the exterior flat-sided end portion 204 of the shaft 200. As illustrated in FIGS. 6 and 10, a linkage rod 206 is pivotally mounted in an opening 208 formed in the lever 202 and retained axially therein by a suitable fastener 210. As illustrated in FIGS. 7 and 10, a partially exterior-toothed member 212 is secured to the flat-sided end portion 214 of the shaft 200 in the chamber 120 adjacent the toothed member 122. The partially toothed member 212 at times meshes with a toothed portion 216 formed on a side of the rack member 131. As illustrated in FIG. 10, the linkage rod 206 is pivotally connected to a lever member 218 mounted on a shaft 220 extending into the transmission housing 110 for the usual connection with the reverse speed ratio selecting mechanism therein.

In operation, it may be noted in FIGS. 5 and 7 that manual actuation of the flexible shift cable 130 will rotate the toothed member 122, thereby rotating the shaft 124. As may be noted in FIGS. 7 and 9, rotation of the shaft 124 will, through the flat-sided end portion 160 thereof, cause the plate member 170 to rotate about the axis of the shaft 124. The various shift positions of the plate member 170 which correspond to the usual NEUTRAL, FIRST, SECOND, THIRD, and FOURTH positions, are illustrated in FIG. 9 as points N-1-2-3-4, respectively, and correspond to the same-identified points along the rack member 131 of FIG. 5.

It is apparent that, in view of the flat sides 127 formed on the shaft 124, rotation of the toothed member 122 to rotary positions corresponding to any of the aforedesignated six rack member 131 positions will correspondingly rotate the plate member 170 to the respective positions illustrated in FIG. 9. The cam grooves 194 and 196 are contoured such that the shaft 184 of each of the two shift forks 182 will be caused to pivot about the respective fixed axes "A" and "B" (FIG. 9) of the shafts 136. This results in the axis of each shaft 184 being moved in an arcuate path such that when any of the "1," "2," "3" or "4" shift ratio positions illustrated in FIG. 9 is selected, one of the shafts 184 will be positioned in a "Neutral" or "N" position. It may be noted in FIG. 9 that all of the variously illustrated "Neutral" positions fall along an arc of a circle whose center is at the axis of the shaft 124 on which the plate member 170 is mounted. The toothed member 122 is illustrated in FIG. 5 as being positioned by the shift cable 130 in "Neutral," and both the shafts 184 in FIG. 9 correspondingly assume a "Neutral" position.

When the toothed member 122 (FIG. 5) is next moved to the "First" or "1" position, it may be noted in FIG. 9 that, due to the contoured shape of the cam grooves 194 and 196, the left-hand shaft 184 will have been moved along the arcuate path from "Neutral" to a position identified as "1" or "First," while the right-hand shaft 184 will have been moved along the arcuate path to a new position "N." It may be realized that the circular plate member 170 will have rotated in a clockwise direction about the shaft end portion 166, with the right-hand shaft 184 (FIG. 9) having been cammed rightwardly by the right-hand cam groove 196 until the portion thereof identified by the encircled numeral "1" has moved to the arcuate path "1" position. In the meantime, the left-hand cam groove 194 will have moved past the left-hand shaft 184 until the position identified as "$N_1$" is on the cross-hatched "N" of FIG. 9.

Rotation of the toothed member 122 to the "Second" or "2" position in FIG. 5 by manual actuation of the flexible cable 130 moves the right-hand shaft 184 (FIG. 9) radially inwardly to the "2" position on the arc about the axis "A" of the shaft 136, by virtue of the shaft 184 having to follow the radially inwardly extending arcuate portion of the right-hand cam groove 196, with the encircled "2" position representing the position of the right-hand shaft 184 on the horizontal line through the center of the plate member 170. At the same time, the "$N_2$" position of the left-hand cam cam groove 194 will have moved to the cross-hatched "N" position.

Rotation of the toothed member 122 by the toothed rack member 131 to the "Third" or "3" position in FIG. 5 will correspondingly cause the left-hand shaft 184 in FIG. 9 to have moved radially inwardly to the point identified as "3" on the arc about the axis "B" of the shaft 136, with the arcuate position of the left-hand cam groove 194 identified as "3" now being located on the numeral "3" spot about the axis "3" of the left-hand shaft 136. It is apparent that, at the same time, the "$N_3$" position of the right-hand cam groove 196 will have moved to the cross-hatched "N" position.

In moving the toothed rack member 131 leftwardly (FIG. 5) until the toothed member 122 has been rotated to the "4" position will have caused the left-hand shaft 184 to have moved back along the arc about the axis "B" of the left-hand shaft 136 through the illustrated "Neutral" position, to the "4" position, with the lower end of the left-hand cam groove 194 now located therearound. At the same time, the "$N_4$" position of the right-hand cam groove 196 will have moved to the cross-hatched "N" position.

Assume now a return movement of the toothed rack member 131 to the "Neutral" or "N" position in FIG. 5. This rotates the plate member 170 back to the position illustrated in FIG. 9. It should be noted that during the rotation of the plate member 170, both of the shafts 184 will have attained a "Neutral" or "N" position intermediate each of the four speed ratio 1-2-3-4 positions, all of the "Neutral" or "N" positions being on the same circular path about the axis of the shaft 124.

When the toothed rack member 131 is moved to the "Reverse" or "R" position in FIG. 5, the partially toothed member 212 of FIG. 10 will have been rotated in a clockwise direction about the axis of the shaft 214, moving the lever 202 in a clockwise direction causing the linkage rod 206 to pivotally rotate the lever 218 in a clockwise direction about the axis of the shaft 220 to assume the position identified as "R" in FIG. 10. This will have effected a reverse speed ratio within the transmission housing 110.

The embodiment illustrated in FIGS. 11–16 is generally similar in structure and operation to the abovedescribed four-speed transmission arrangement illustrated in FIGS. 5–10. There is no smaller housing portion similar to the housing 118 of FIG. 6 but, rather, the toothed rack member 222 of FIGS. 11 and 12, corresponding to the toothed rack member 131 of FIG. 5 is located within the transmission housing 224. Also, the partially toothed member 212 illustrated in FIGS. 6, 7, and 10 has been replaced by a lever 226 (FIGS. 11 and 12) pivotably mounted on a shaft 227 and operating in cooperation with a cam slot 228 formed at a predetermined location on the outer periphery of a substantially circular plate member 230. A wall portion 231 of the slot 228 causes a shaft 232 to travel between the "Neutral" or "N" position illustrated in FIG. 11 and the "Reverse" or "R" position illustrated in FIG. 16.

Referring now to FIG. 12, it may be noted that the shaft 232 has one end thereof mounted in a guide slot 234 formed in the transmission housing 224 and extends from the guide slot 234 through a slot 236 formed in the lever 226, and thence across the plane of the circular plate member 230, with the other end thereof adjacent the cam slot 228.

It may be noted in FIG. 11 that the shaft 227 has oppositely disposed flat sides 238 formed thereon, on which is mounted a circular exterior-toothed plate member 240 whose teeth 241 mesh with the teeth 242 of the rack member 222. The shaft 227, as indicated above, extends through an end of the lever 226 (FIG. 12) and thence through an opening 243 formed in oppositely disposed bosses 244 and 246 formed on the respective inside and outside surfaces of a wall 247 of the transmission housing 224. An external lever 248 is mounted on the extended end 249 of the shaft 227. The lever 248 extends in the same radial direction as that of the internal lever 226 mounted within the transmission housing 224. A linkage rod 250 is pivotally mounted at one end 252 thereof adjacent the extended end 253 of the external lever 248 and retained thereon by a suitable fastener 254. The other end 256 of the linkage rod 250 is pivotally mounted adjacent the extended end of a reverse lever 258 which is secured at its other end to a reverse shaft 260. The reverse shaft 260 extends into the transmission housing 224 to engage the reverse speed ratio components (not shown) contained therein.

The fixed connector mechanism 141 in FIG. 11 is the same as that illustrated in FIG. 5 and discussed above and hence carries the same component reference numerals as those included in FIG. 5. A single, longer contoured cam slot or groove 262 (FIG. 11) is formed in the circular plate member 230, in contrast to the dual cam grooves 194 and 196 of FIG. 9.

Insofar as the operation is concerned, the shift fork shafts 184 are illustrated in FIG. 11 in the "Neutral" position. In view of the discussions above relative to the operations of the three-speed FIG. 4 and the four-speed FIG. 9 structures, it should be apparent that insofar as the FIG. 11 four-speed arrangement is concerned, movement of the toothed rack member 222 by the cable 130 will cause the right-hand shaft 184 (FIG. 11) to be moved along the arcuate path, between positions "1" and "2," about the pivot point "C" by the adjacent walls of the cam grooves 262 in the manner discussed above relative to FIGS. 4 and 9. It may be noted that when the right-hand shaft 184 is in either the "First" or Second" speed ratio position, the left-hand shaft 184 will be retained in a "Neutral" position by an oppositely disposed portion of the cam groove 262. When the circular plate member 240 is rotated such that the cam groove 262 moves the left-hand shaft 184 along the arcuate path between points "3" and "4" about pivot point "D," for the "Third" and "Fourth" speed ratio positions respectively thereof, the right-hand shaft 184 will be in the "N" position about the axis "C," as well as in respective oppositely disposed "$N_3$" and "$N_4$" positions in the cam groove 262. Again, all "Neutral" positions of the shafts 184 within the cam groove 262 are on a constant circular path about the axis of the shaft 227, with the "First" and "Fourth" shift positions being located radially outwardly thereof, and "Second" and "Third" shift positions being located radially inwardly thereof.

When the rack member 222 is moved by the cable 130 so as to rotate the plate member 240 to the "Reverse" or "R" position illustrated in FIG. 11, the right-hand wall 231 of the cam slot 228 will force the shaft 232 to move from the right-hand end (FIG. 11) to the left-hand end of the guide slot 234 formed in the wall 247 of the transmission housing 224. Since the external lever 248 (FIG. 13) moves along with the internal lever 226 (FIG. 11), both will be moved in a counterclockwise direction by the counterclockwise movement of the shaft 232. Such movement of the external lever 248 will move the linkage member 250, causing the reverse lever 258 to rotate the reverse shaft 260 to select the reverse speed ratio within the transmission housing 224. As may be determined in FIGS. 11 and 14, when the shaft 232 is in the left or reverse end portion of the guide slot 234, the shafts 184 will be in the "Neutral" positions identified as "$N_R$" in the cam groove 262.

FIGS. 15 and 16 illustrate an alternate embodiment wherein the linkage member 250 is mounted within the transmission housing 224, instead of being connected to the lever 248 of FIG. 12 on the outside of the housing 224. As illustrated in FIG. 16, the linkage member 250 includes a threaded end 264 which is threadedly connected to a clip 266 mounted around the shaft 232. Thus it may be noted that as the shaft 232 is moved along the guide slot 234, the shaft 232 and the surrounding clip 266 will move the linkage member 250 so as to rotate the reverse lever 258 and the reverse shaft 260 in a counterclockwise direction to the reverse speed ratio position.

It should be apparent that the invention provides an improved arrangement for selecting the various speed ratios of either a three-speed or a four-speed synchromesh transmission, wherein a single linkage means is employed to pivot a single shift lever mounted on a single transmission shaft extension, the latter causing the rotation of a disc-like element having contoured cam grooves formed thereon for the simultaneous positioning of the conventional shift forks as required for the selected drive ratio.

It should be further apparent that it is advantageous to have the above-mentioned single lever and its pivotal connection with the cable fully enclosed either in the transmission housing or in a cavity formed on the transmission housing and shielded by a cover plate.

It should be still further apparent that the cable arrangement is suitable for use with either an instrument panelmounted or steering column-mounted manual shift lever, as well as being adaptable for use with a floor-mounted shift lever.

While several embodiments of the invention have been shown and described, other modifications thereof are possible.

We claim:

1. A shift control mechanism for a synchromesh transmission, said control mechanism comprising a pair of shift forks, an extension shaft formed on each of said shift forks, the axis of each of said extension shafts being movable in a lateral path for correspondingly moving said shift forks to select the desired speed ratios within said transmission, a single shaft rotatably mounted through a wall of said transmission, a first plate member having teeth formed on a portion of the outer periphery thereof and being secured to the interior end of said single shaft, a rack member having teeth formed thereon for at times meshing with said teeth of said first plate member, a manually-actuable cable connected to said rack member for causing reciprocal movement thereof, a pivotable member secured to said interior end of said single shaft, a pair of contoured cam grooves formed in said pivotable member, each of said contoured cam grooves having portions thereof formed along arcs of a circle about the axis of said single shaft with other portions thereof being radially inward and radially outward of said circle, said extension shafts being slidably mounted in said contoured cam grooves such that said extension shafts are caused to laterally move one of said shift forks into a neutral position while moving the other of said shift forks into some one of first, second, third, or fourth speed ratio positions in response to pivotal movement of said shift lever and said single shaft by said cable, additional teeth formed on a side of said rack member, a second plate member having teeth formed on a portion of the outer periphery thereof for meshing with said additional teeth on said rack member when said teeth on said first plate member are out of mesh with said first-mentioned teeth of said rack member, a reverse speed ratio positioning shaft, and linkage means operatively connected to said second plate member for rotating said reverse speed ratio positioning shaft in response to manual movement of said cable.

2. A shift control mechanism for a synchromesh transmission, said control mechanism comprising a pair of shift forks, an extension shaft formed on each of said shift forks, the axis of each of said extension shafts being movable in a lateral path for correspondingly moving said shift forks to select the desired speed ratios within said transmission, a single shaft rotatably mounted through a wall of said transmission, a plate member having teeth formed on a portion of the outer periphery thereof and being secured to the interior end of said single shaft, a rack member having teeth formed thereon for at times meshing with said teeth of said plate member, a manually-actuable cable connected to said rack member for causing reciprocal movement thereof, a pivotable member secured to said interior end of said single shaft, a generally circular contoured cam groove formed in said pivotable member, said generally circular contoured cam groove having portions thereof formed along arcs of a circle about the axis of said single shaft with other portions thereof being radially inward and radially outward of said circle, said extension shafts being slidably mounted in said contoured cam groove such that said extension shafts are caused to laterally move one of said shift forks into a neutral position while moving the other of said shift forks into some one of first, second, third, or fourth speed ratio positions in response to pivotal movement of said shift lever and said single shaft by said cable, a guide slot formed in a wall of said transmission, a shaft member having one end thereof mounted in said guide slot, a cam slot formed adjacent the outer periphery of said pivotable member and positioned so as to contact said shaft member, a reverse speed ratio positioning lever, and linkage means operatively connected between said shaft member and said reverse speed ratio positioning lever, said shaft member being movable in said guide slot by said pivotable member in response to manual actuation of said cable for moving said linkage means to rotate said reverse speed ratio positioning lever.

3. A shift control mechanism for a synchromesh transmission, said shift control mechanism comprising a housing, a reverse-first and a second-third shift fork located in said housing, a shaft pivotally mounted through a wall of said housing, a shift lever mounted on the exposed end of said shaft, a manually-actuable cable pivotally connected to said shift lever for causing pivotal movement thereof, a pivotable flat plate member secured to the interior end of said shaft in a parallel relationship with said wall of said housing, a pair of contoured cam grooves formed in said pivotable flat plate member, a shaft-like extension formed on each of said shift forks and extending through said respective cam grooves and adapted to having levers pivotally mounted on the extended ends thereof, first and second levers each pivotally mounted at one end thereof on said wall of said housing intermediate said wall of said housing and said flat plate member and pivotally mounted at the other ends thereof on said respective extended ends of said shaft-like extensions for operatively cooperating with said contoured cam grooves in response to reciprocal pivotal movements of said shift lever and said shaft by said manually-actuable cable to cause said shaft-like extensions to concurrently move through respective arcuate paths about said one end of each of said respective first and second levers for selectively moving said second-third shift fork into a neutral position while moving said reverse-first shift fork into one of reverse and first speed ratio positions and alternately moving said reverse-first shift fork into a neutral position while moving said second-third shift fork into one of second and third speed ratio positions, and fastener means secured to each of said shaft-like extensions adjacent each side of each of said first and second levers for axially locating said shaft-like extensions.

* * * * *